United States Patent [19]

Sprouse

[11] Patent Number: 4,693,403

[45] Date of Patent: Sep. 15, 1987

[54] GLASS BREAKING TOOL

[76] Inventor: Michael L. Sprouse, 6304 Woodley Rd., Clinton, Md. 20735

[21] Appl. No.: 815,017

[22] Filed: Dec. 31, 1985

[51] Int. Cl.⁴ ............................................. C03B 33/02
[52] U.S. Cl. .................................... 225/2; 125/23 R; 225/93; 225/103
[58] Field of Search ...................... 225/2, 93, 96, 96.5, 225/103, 104; 30/164.9, 164.95; 125/23 R, 40

[56] References Cited

U.S. PATENT DOCUMENTS

| 254,415 | 2/1882 | Wellington | 125/23 R |
| 1,162,685 | 11/1915 | Derbyshire | 125/23 R |
| 1,360,446 | 11/1920 | Rose | 125/23 R |
| 2,475,041 | 7/1949 | Mattson | 73/91 |
| 3,169,683 | 2/1965 | Pierce | 225/103 |
| 3,297,015 | 1/1967 | Crawford | 125/23 R |
| 3,565,351 | 2/1971 | Ross | 241/99 |
| 3,568,657 | 3/1971 | Gue | 125/40 |
| 3,570,733 | 3/1971 | Allen | 225/104 |
| 4,405,005 | 9/1983 | Zanker | 144/193 C |
| 4,470,440 | 9/1984 | Thor | 144/193 |

Primary Examiner—Frank T. Yost
Attorney, Agent, or Firm—Holman & Stern

[57] ABSTRACT

A glass breaking tool has a blunt end on a first member which is adapted to be placed adjacent a glass plate. A second member is moveable into striking engagement with the first member so as to transmit impact forces to the blunt edge to the glass, without relative motion between the first member and the glass plate. This permits breaking a glass plate along a score line, when the blunt edge is placed directly beneath a score line in a glass plate. The second member is guided in its travel by a guide rod, the guide rod having a retaining ring in the end thereof to retain the second member on the guide rod.

6 Claims, 5 Drawing Figures

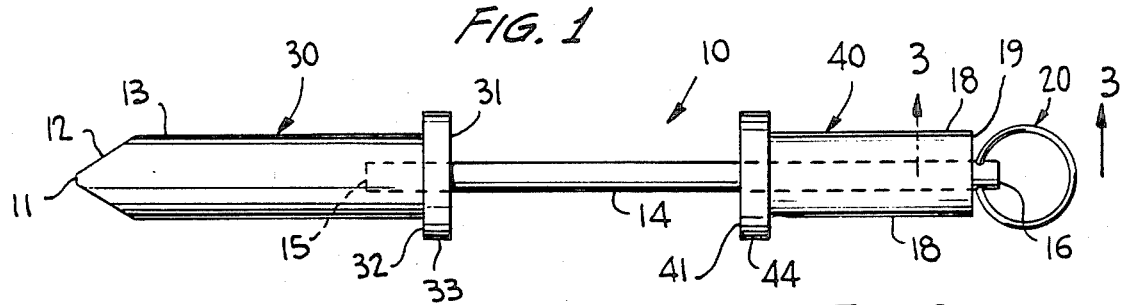
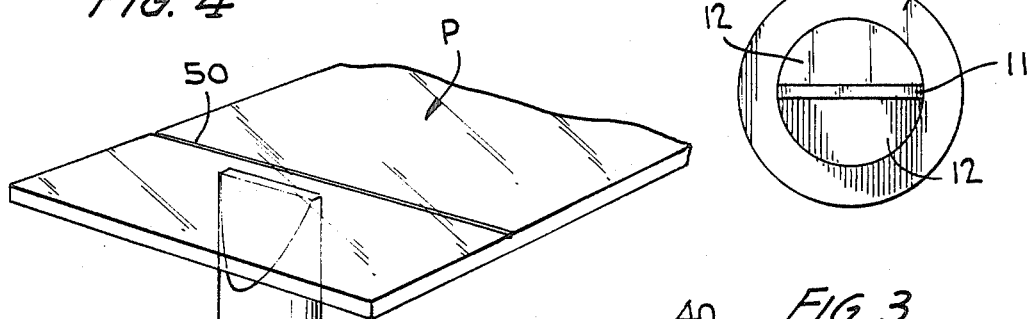
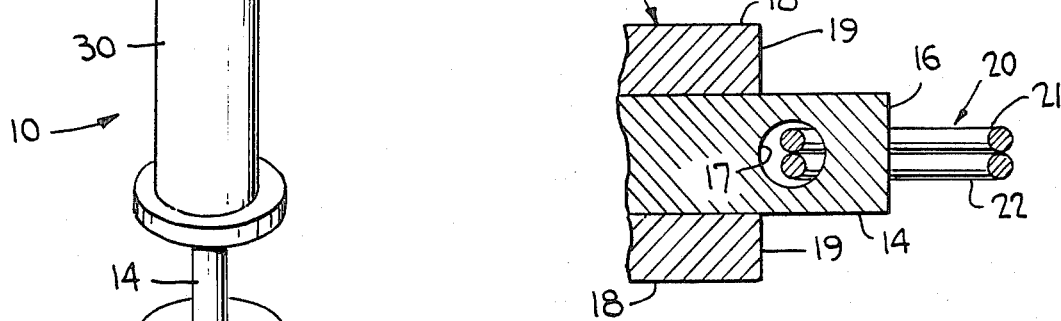
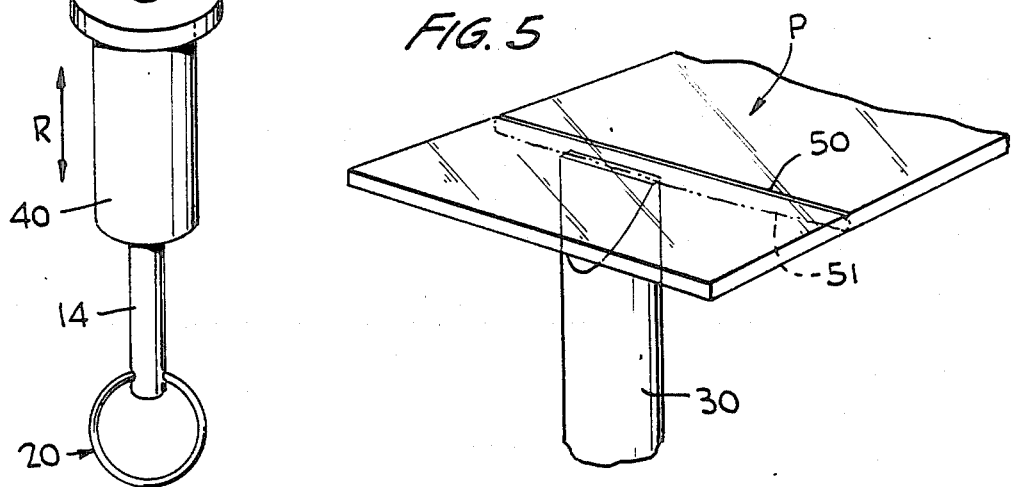

GLASS BREAKING TOOL

BACKGROUND OF THE INVENTION

It is a problem in the prior art to break a piece or sheet of glass into two or more pieces with a smooth cut so as to lower the time and labor requirements in polishing or edging of the glass. In particular, it is a problem in the art to break glass sheets.

In the prior art devices, impact devices are directly moved into striking engagement with the glass sheet under the score line. This method of breaking glass does not always produce a clean edge, but rather often produces gouges and flaring. This causes the glazier and glass cutter to spend additional time in the finishing of cut edges of the glass.

An example of the foregoing type of glass breaking device is that shown in U.S. Pat. No. 3,169,683. Here, an extension portion 19 acts together with a core 16 as a hammer. The extension 19 has a ball point 20. The support for the hammer is moved across a sheet of glass directly opposite a score line, so that the glass can be broken along the score line. In this patent, the top surface of the glass is scored along a line 41, and the impactor 10 is held against the undersurface of the sheet 40 with the ball point of the hammer directly under the scored line.

In U.S. Pat. No. 3,568,657, a rock-breaking tool is shown having at one end a chisel point and at the other end, a chisel edge. A slide member 26 is provided for providing an impact force to either the chisel or the chisel edge. In this patent, both the chisel point and the chisel edge are relatively sharp, and would damage a sheet of glass rather than breaking the sheet of glass along a score line. The tool of this patent is useful for breaking the object with which it is in contact.

A similar tool is that shown in U.S. Pat. No. 2,475,041, also having a sharpened tip which would break a glass object with which it is in contact, rather than causing a clean break along a score line.

U.S. Pat. No. 4,470,440 shows another impact-producing tool having a sharpened edge. The sharpened edge of this patent is adapted for directly cutting and breaking into a log against which the edge is placed. This type of sharpened edge is not suitable for use with a glass-breaking tool, as is known in the art, since a sharp edge itself produces fractures and breakage of the glass.

Other axial-impact type hand tools are shown in U.S. Pat. Nos. 3,036,482; 3,565,351; and 4,405,005.

SUMMARY OF THE INVENTION

The present invention relates to a method of tapping a scored glass sheet to smoothly cut the sheet, thus lowering the time and labor invovled in polishing or edging of glass which has been so cut.

The device of the present invention includes a compound taper having a blunt edge placed directly beneath the score line and against the glass, and then moving a slider weight sharply up against the impact head of the taper, thereby causing impact forces to be transmitted through the blunt edge to the glass so as to cause a controlled fault between the taper and the scored line. This type of cutting produces a smooth cut for straight score lines, curved score paths, as well as scored circles.

The present invention includes a first generally cylindrical member having a guide rod fixedly attached at one end thereof, the first generally cylindrical member having a pair of generally planar converging sides. The guide rod guides a second generally cylindrical member such that movement of the generally cylindrical member along the guide rod permits striking contact of the second member against the first member.

The guide rod preferably has a bore in one end with a wire loop inserted therein, so as to retain the second member on the guide rod.

In use, the blunt end is placed in contact with the glass sheet at a location opposite the score line, for example, directly beneath a score line when the glass sheet is oriented in a horizontal plane. Then, the second member is moved into striking contact with the first member along the guide rod, so that the impact force is transmitted to the blunt end and into the glass sheet, thereby causing a controlled fault between the blunt end of the first member and the scored line.

BRIEF DESCRIPTION OF THE DRAWINGS

FIG. 1 is a side elevational view of a glass breaking tool according to the present invention;

FIG. 2 is a front elevational view of the device of FIG. 1 as seen from the left hand side of FIG. 1;

FIG. 3 is a sectional view taken along lines 3—3 of FIG. 1;

FIG. 4 is a perspective view of the glass breaking tool of the present invention in contact with a glass sheet directly below a score line; and FIG. 5 is a perspective view, partially broken away, showing a fault line caused after operation of the glass breaking tool of the present invention.

DETAILED DESCRIPTION OF THE INVENTION

The present invention relates to an apparatus and method for breaking glass along a score line to form a relatively clean cut.

In particular, the apparatus of the present invention includes a first member having a portion adapted to contact the glass surface, the portion being tapered and having a relatively blunt end adapted to contact the glass surface and transmit force to the glass surface. A guide rod is affixed to the first member for guiding a second member thereon. The second member is a generally cylindrical body having a bore therein for slidably receiving the guiding rod.

In use, the second member is moved along the guide rod into striking contact with the first member, when the first member has been positioned with its blunt end in contact against a glass surface directly opposite a score line. The operation is repeated along the glass surface opposite the score line until the glass can be separated into at least two pieces along the score line.

In FIG. 1 is shown the glass breaking tool 10 in a position with a first member 30 separated from a second member 40 along a guide rod 14. The second member 40 is retained on the guide rod 14 by a wire loop 20 which is disposed within a bore 17 (shown in FIG. 3). The guide rod 14 has a first end 15 fixed within the first member 30 as by threaded engagement therewith or by welding or the like, and has a second end 16 which is free.

The first member 30 is generally cylindrical, and has a pair of converging planar surfaces 12, 12 which taper to a blunt end 11. The first member 30 has a flange 33 disposed thereon, the first member 30 having an end surface 31, and an opposing flange surface 32.

The second member 40 is generally cylindrical, and has a bore formed therein to receive the guide rod 14 in sliding engagement therewith. The second member 40 has a generally cylindrical body portion 18 and a flange 44. The second member 40 has an end 41 and an opposing end 19. A flange surface 21 is provided which is generally parallel to the end surface 41.

The first member 30 has a generally cylindrical portion 13. The first member 30, the second member 40, and the guide rod 14 are preferably composed of metal, such as steel, brass, or the like. However, any material can be used which is sufficiently strong to withstand the impact forces required to cause breaking of the glass sheet.

FIG. 2 shows an enlarged view of the end 11 of the first member 30. Here, the blunt end 11 is seen as a planar surface which meets generally planar tapering side walls 12, 12.

FIG. 3 shows the assembly of the guide rod 14 within the second member 40, and shows a preferred retaining ring 20 having a first wire loop 21 and a second wire loop 22. Such wire loops are commonly found used as key rings and the like.

FIG. 4 is a perspective view of the blunt edge of the first member 30 positioned in contact against a glass plate P directly beneath a portion of a score line 50. As indicated by the double headed arrow R, the member 40 is moveable upwardly as well as downwardly along the guide rod 14. The flange 44 of the member 40 is used to protect the fingers and thumb when manually operating the device 10. Similarly, the flange 33 also protects the fingers and thumb, and the bottom of the hand, when a hand is used to support the first member 30 against the glass plate P.

In use, the second member 40 is moved downwardly along the guide rod 14 a desired distance away from the first member 30. Then, with the blunt edge 11 of the first member 30 in contact already with a desired portion of a glass plate P, the second member 40 is slid upwardly until it strikes the surface 31 of the first member 30. Thus, direct striking contact between the member 30 and the glass plate P is avoided, rather force is merely transmitted through the end 11 to the glass plate P.

FIG. 5 illustrates the result of the foregoing operation, namely the formation of a fault line 51 defining a fault plane lying between the score line 50 and the fault line 51. The striking operation described hereinabove, is repeated all along the region of the glass plate P directly underlying the score line 50, until the glass plate P can be separated into two pieces. This produces a clean cut of the glass pieces, having a lowered requirement for polishing or edging of glass which has been cut, as compared to the prior art.

The score line 50 need not be a straight line, but can be of any curved shape as well. Furthermore, the score line 50 can be so formed as to subdivide a plate P into more than two pieces. Thus, operation of the tool 10 of the present invention can be used to separate a glass plate P into more than two pieces during the operation thereof. Also, closed curved shapes, such as circles, ovals, and the like, can also be formed by the score line 50, and the present invention including the tool 10 is usable therewith to form relatively clean cut surfaces.

The tool and method of the present invention is capable of achieving all of the above-described advantages and results, and while a preferred embodiment of the glass breaking tool and method of use thereof has been illustrated and described, it will be understood that the present invention is not limited thereto, but is embodied within the scope of the following claims.

I claim:

1. A method of breaking glass along a score line, comprising the steps of:
   (a) providing a sheet of glass with a score line;
   (b) providing an instrument; said instrument having:
      (1) a first member with a blunt end adapted to contact said sheet of glass; (2) a guiding means connected to said first member; (3) a second member moveable along said guiding means into striking engagement with said first member;
   (c) positioning said blunt end of said instrument against said sheet of glass at a location opposite said score line;
   (d) moving said second member into striking engagement with said first member, transmitting force to asid blunt end and thence to said sheet of glass, causing breaking of said sheet of glass in the vicinity of said score line.

2. A method as claimed in claim 1, further comprising the step of moving said blunt end along said score line to break glass along the entire length of said score line.

3. A method as claimed in claim 2, further comprising separating said sheet of glass into at least two pieces along said score line.

4. A method as claimed in claim 1, wherein in step (b)(2) said guiding means has a retaining means thereon to retain said second member on said guiding means.

5. A method as claimed in claim 1, wherein in step (b)(1) said first member is a generally cylindrical body.

6. A method as claimed in claim 1, wherein in step (b)(3) said second member is a generally cylindrical body having a bore therethrough for receiving said guiding means therein.

* * * * *